United States Patent [19]

Meyer

[11] Patent Number: 5,909,574
[45] Date of Patent: Jun. 1, 1999

[54] COMPUTING SYSTEM WITH EXCEPTION HANDLER AND METHOD OF HANDLING EXCEPTIONS IN A COMPUTING SYSTEM

[75] Inventor: Peter A. Meyer, Nepean, Canada

[73] Assignee: Northern Telecom Limited, Montreal, Canada

[21] Appl. No.: 08/996,765

[22] Filed: Dec. 23, 1997

[51] Int. Cl.[6] .................................................. G06F 9/00
[52] U.S. Cl. .................. 395/591; 395/800.32; 395/183.1
[58] Field of Search .......................... 395/800.3, 800.32, 395/800.28, 800.26, 591

[56] References Cited

U.S. PATENT DOCUMENTS

| 4,351,024 | 9/1982 | Bradley et al. | 395/680 |
|---|---|---|---|
| 5,210,844 | 5/1993 | Shimura et al. | 711/153 |
| 5,537,575 | 7/1996 | Foley et al. | 711/141 |
| 5,655,100 | 8/1997 | Ebrahim et al. | 395/471 |
| 5,721,871 | 2/1998 | Ginsberg et al. | 395/479 |

*Primary Examiner*—Eric Coleman
*Assistant Examiner*—Mackly Monestime

[57] ABSTRACT

A computing system in which permanent state changes to portions of the system are effected using transactions, including an exception handier and a method of handling exceptions in such a system is disclosed. Specifically, the computing system comprises a processor for executing at least one process; and scratchpad memory. A transactional subsystem is interconnected with the processor and has a plurality of states. State changes to the transactional subsystem are made irreversible only upon successful completion of a transaction. Program memory interconnected with the processor contains an exception handler for handling an exception dependent on one of a transaction. The handler adapts the processor to buffer data resulting from the exception in the scratchpad memory; and upon successful completion of the transaction, transfer the buffered data to an exception buffer accessible by a software process executing on the processor. Upon unsuccessful completion of the transaction, the buffered data in the scratchpad memory is discarded. Preferably, the transactional subsystem is a shared memory system.

13 Claims, 8 Drawing Sheets

COMPUTING SYSTEM WITH EXCEPTION HANDLER AND METHOD OF HANDLING EXCEPTIONS IN A COMPUTING SYSTEM

FIELD OF THE INVENTION

The present invention relates to a computing system in which permanent state changes to a portion of the system are effected using transactions, and more particularly to an exception handler and a method of handling exceptions in such a system.

BACKGROUND OF THE INVENTION

Existing computing systems, as for example a multi-processor, shared memory system as disclosed in U.S. patent application Ser. No. 08/774,548 entitled "Shared Memory Control Algorithm for Mutual Exclusion and Rollback" filed Dec. 30, 1996 naming Brian Baker and Terry Newell as inventors, and incorporated herein by reference, effect certain permanent system changes in "transactions". In this system, multiple processors execute processes that may modify shared memory. Memory changes made by a process executing on a processor do not permanently affect the shared memory until the process successfully completes. During process execution, memory used by a process is "owned" by that process; read and write access by other processes is locked out. If a process does not successfully complete or attempts to access memory owned by another process, the process is aborted and memory affected by the process is "rolled back" to its previous state. Memory changes are only made permanent (or "committed") upon successful process completion. In this context, "transactions" may be considered those intervals between initial system accesses that may ultimately permanently affect the system state, and the "committal" of the state changes to the system. This shared memory system is referred to as a transactional system.

By contrast, conventional computing systems effect permanent state changes at any time. These systems may be considered "non-transactional systems".

Notwithstanding the use of transactions to permanently cause changes to shared memory in the above described computing system, irreversible events continue to affect the state of the system. These events are said to be "non-transactional" and are unique and non-repeatable. Examples of such events include hardware state changes; communications with non-transactional systems; and processor interrupts or exceptions. Ideally, state changes caused by non-transactional events should coincide with permanent state changes effected in any transactional system.

In order to avoid the effect of exceptions, these could simply be blocked from occurring. Data normally provided by the exceptions would be provided and collected by the base (ie. non-exception) processes. However, blocking all exceptions would severely impact overall system performance. This impact on overall performance would be exacerbated in a multi-processor system. Moreover, by its very nature, the locking out of transactions in a real time system would be impossible. A real time system must be able to immediately react to events, including exceptions.

Another approach might utilize a simple buffer formed in memory to transfer data between exception and base levels. Critical sections of data are preserved by software system exclusion primitives. However, unlike in the above described transactional shared memory system, the rollback of memory altered as a result of a process would not be possible.

As should be apparent, a method of handling exceptions within a transactional system that allows for memory rollback and minimal blocking is desirable.

SUMMARY OF THE INVENTION

In accordance with an aspect of the present invention there is provided in, a computer system comprising at least one processor for executing a plurality of software processes and one memory module comprising shared memory accessible by the processor, wherein altering the shared memory is reversible until an executing process has successfully completed, a method of handling an exception dependent on an executing process comprising the steps of: a) buffering data resulting from the exception in a scratchpad memory; b) upon successful completion of the process, moving the buffered data to a buffer system accessible by software processes executing on the system; and c) upon unsuccessful completion of the process, discarding the buffered data in the scratchpad memory.

In accordance with another aspect of the present invention there is provided a computing system comprising a processor for executing at least one process; scratchpad memory; a transactional subsystem interconnected with the processor and having a plurality of states wherein state changes to the transactional subsystem are made irreversible only upon successful completion of a transaction; program memory interconnected with the processor and containing an exception handler for handling an exception dependent on a transaction, the handler adapting the processor to a) buffer data resulting from the exception in the scratchpad memory; b) upon successful completion of the transaction, transfer the buffered data to an exception buffer accessible by software processes executing on the processor; and c) upon unsuccessful completion of the transaction, discard the buffered data in the scratchpad memory.

In accordance with a further aspect of the present invention there is provided a computing system comprising a processor and a transactional subsystem wherein state changes to the subsystem are effected by transactions and are reversible until a transaction has successfully completed, a method of handling exceptions resulting from a transaction, comprising the steps of: a) buffering data resulting from the transaction in a scratchpad memory; b) upon successful completion of the transaction, moving the buffered data to a buffer system accessible by software processes executing on the system; and c) upon unsuccessful completion of the transaction, discarding the buffered data in the scratchpad memory.

BRIEF DESCRIPTION OF THE DRAWING

In figures which illustrate, by way of example, embodiments of the present invention.

DETAILED DESCRIPTION

Figure 1:
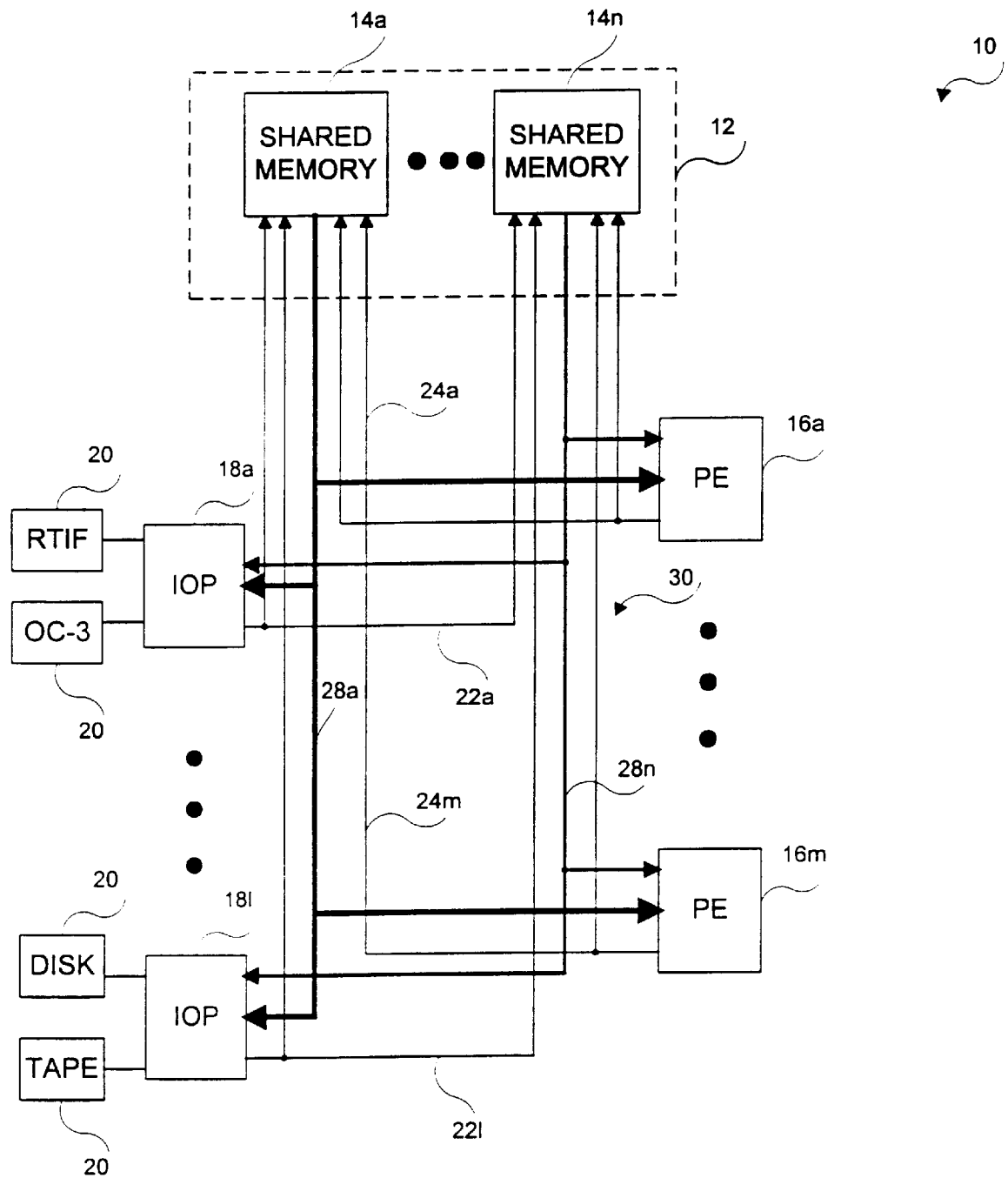
FIG. 1 is a block diagram of multi-processor, shared memory system in accordance with an aspect of the present invention.

FIG. 1 illustrates the architecture of a multi-processor, shared memory computing system 10 exemplary of a preferred embodiment of the present invention. System 10 comprises shared memory 12 which in turn comprises a plurality of shared memory modules 14a to 14n (collectively and individually 14). Interconnected with shared memory 12 are a plurality of processing elements ("PE"s) 16a to 16m (collectively and individually 16) and a plurality of input/output processors ("IOP"s) 18a to 18l (collectively and individually 18). Connected to each IOP 18 is one or more input/output peripherals 20. Such peripherals may include disc and tape storage devices or communications interfaces such as OC3 interfaces.

Shared memory 12, PEs 16 and IOPs 18 are interconnected by a set of communication links collectively referred to as an extended architecture interconnect 30 ("XAI"). Physically, the XAI 30 comprises links 22a to 22l (individually and collectively referred to as 22); 24a to 24m (individually and collectively referred to as 24); and 28a to 28n (individually and collectively referred to as 28). These are unidirectional point to multi-point serial links.

Each IOP 18 and PE 16 is interconnected with each shared memory module 14 by one of links 22 and 24, respectively. These links allow a serial transfer of data from IOPs 18 to shared memory modules 14 and PEs 18 to shared memory modules 14. Each IOP 18 or PE 16 broadcasts all of its outgoing data on one associated link 22 or 24. Each link 22 or 24 is interconnected with each shared memory module 14. Thus, all data broadcast by a single IOP 18 or PE 16 is received by all shared memory modules 14.

Each shared memory module 14 is further interconnected with each PE 16 and IOP 18 by a serial link 28.

Data is transferred between PEs, IOPs and shared memory modules, 16, 18, and 14 respectively, in frames, transferred on links 22, 24 and 28.

Figure 2:
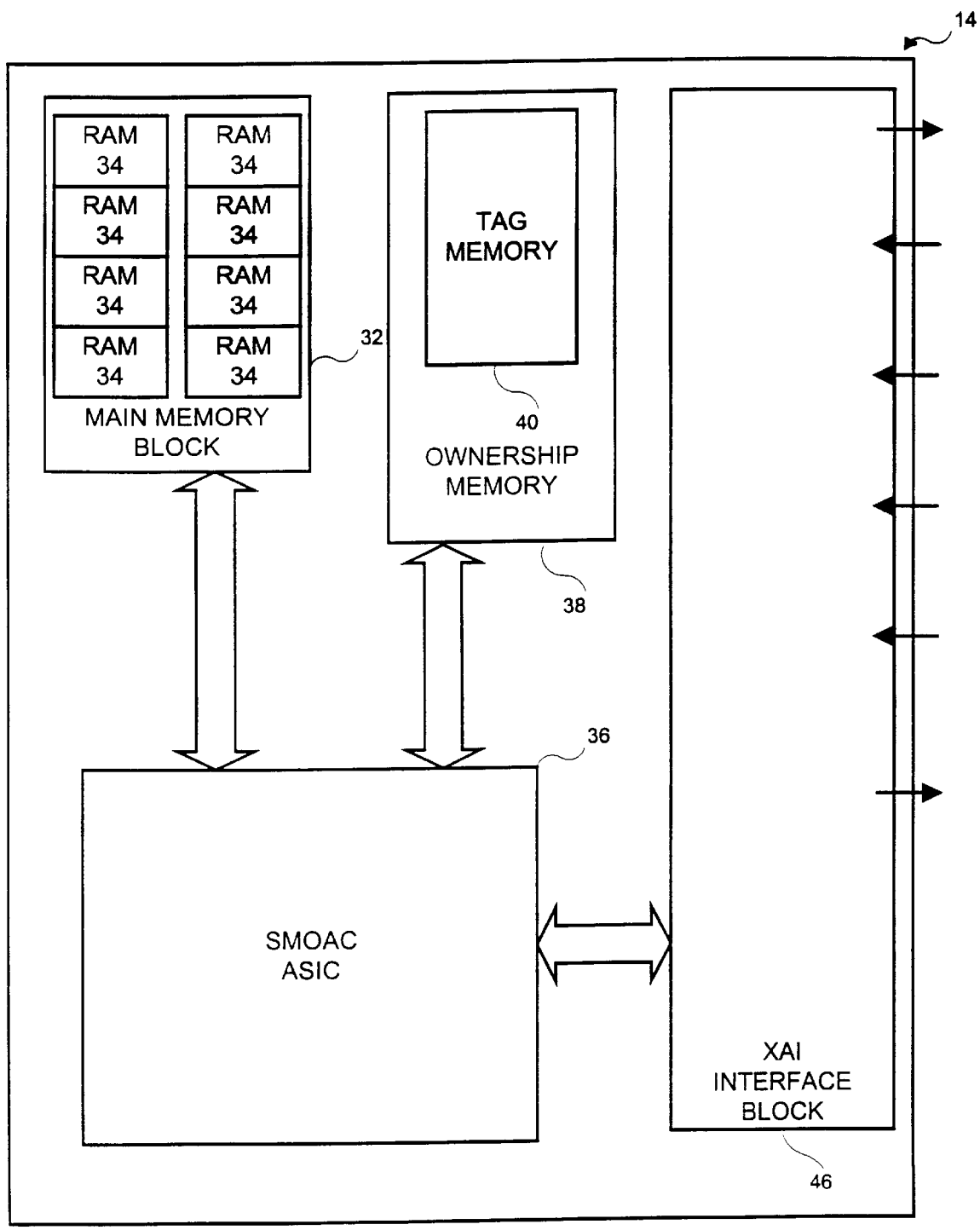
FIG. 2 is a block diagram of a shared memory module of the system of FIG. 1.

FIG. 2 illustrates the architecture of each shared memory module 14. Specifically, each memory module 14 comprises a main memory block 32 which, in turn, comprises up to eight random access memory ("RAM") hybrids 34 that provide main program and data storage for the shared memory module 14. Expansion of memory for system 10 may be achieved by expanding the capacity of memory block 32.

At the heart of each shared memory module 14 is a shared memory ownership and access controller ("SMOAC") 36 application specific integrated circuit. Further connected to SMOAC 36 is ownership memory module 38. Ownership memory module 38 includes tag memory 40.

Tag memory 40 is used by shared memory module 14 to store information identifying the present state of each memory location within main memory block 32 with respect to the memory roll-back and ownership as disclosed in U.S. patent application Ser. No. 08/774,548. As disclosed in that application the data within tag memory 40 includes information concerning whether or not a group of memory locations within main memory block 32 is currently in use by a software process and, if so, the identifier of that process. If a memory is in use by a process, it is said to be "owned" by the process. If a process does not complete, tag memory 40 and memory block 32 allow memory locations previously owned by the not completed process to be restored to their values immediately before the process assumed ownership of the locations. If a process completes, memory changes are committed and the value of the working or modified copy of the memory is transferred to the duplicate copy.

Interconnected with SMOAC 36 is an XAI interface block 46. Preferably, the XAI interface block 46 is formed from one or more ASICs. XAI interface block 46 provides the physical link between memory module 14 and the XAI 30.

Figure 3:
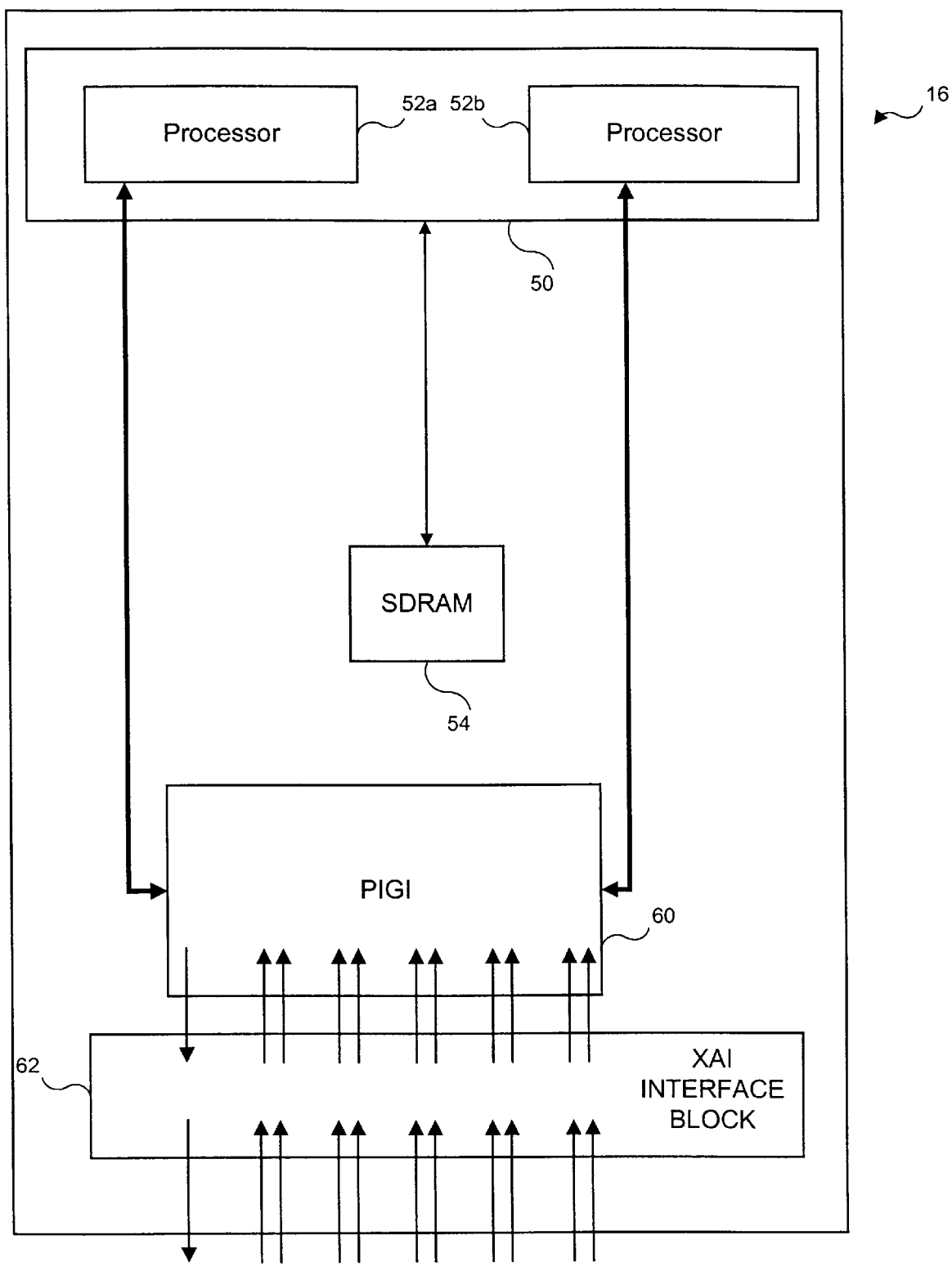
FIG. 3 is a block diagram of a processing element of the system of FIG. 1.

FIG. 3. illustrates the architecture of each PE 16. PEs 16 provide system 10 with multiple spared, fault detecting computing engines each operating in a symmetric multi-processing environment. Each PE 16 maintains an independent service state during operation so that each PE may be individually replaced or upgraded without the need to replace any other hardware or without causing any other interruption to the system. Each PE 16 comprises a processor block 50. Each processor block 50 comprises superscalar RISC microprocessors as central processing units ("CPUs") 52a and 52b. A memory device comprising two-hundred and fifty six (256) megabytes of RAM 54 is interconnected with block 50 and provides fast local access by processors 52a and 52b to a copy of a program used to control operation of processor block 50, and overall control of system 10. Processors 52a and 52b operate in sync-match to enable comprehensive fault detection, and a further layer of redundancy across both processors.

Additionally, interconnected to processor block 50 is a PE interface to Gigabyte interconnect ("PIGI") ASIC 60. PIGI 60 provides the interface for PE 16 to the XAI 30 (FIG. 1). Interconnected with PGI 60 is an XAI interface block 62. XAI interface block 62 is substantially identical to XAI interface block 46 of shared memory modules 14 depicted in FIG. 2. XAI interface block 62 provides the physical interface between each PE 16 and the XAI 30.

The architecture of each IOP 18 (FIG. 1) is not illustrated. Ultimately, IOPs 18 provide PCI interfaces to system 10. Standard serial interfaces; optical (OC3) interfaces; or input/output peripheral such as SCSI hard disk drives; or DAT tape drives may be interconnected to the PCI interfaces. IOPs 18 allow system 10 to act as a high capacity multi-processor, multi-memory telephony switch.

Figure 4:
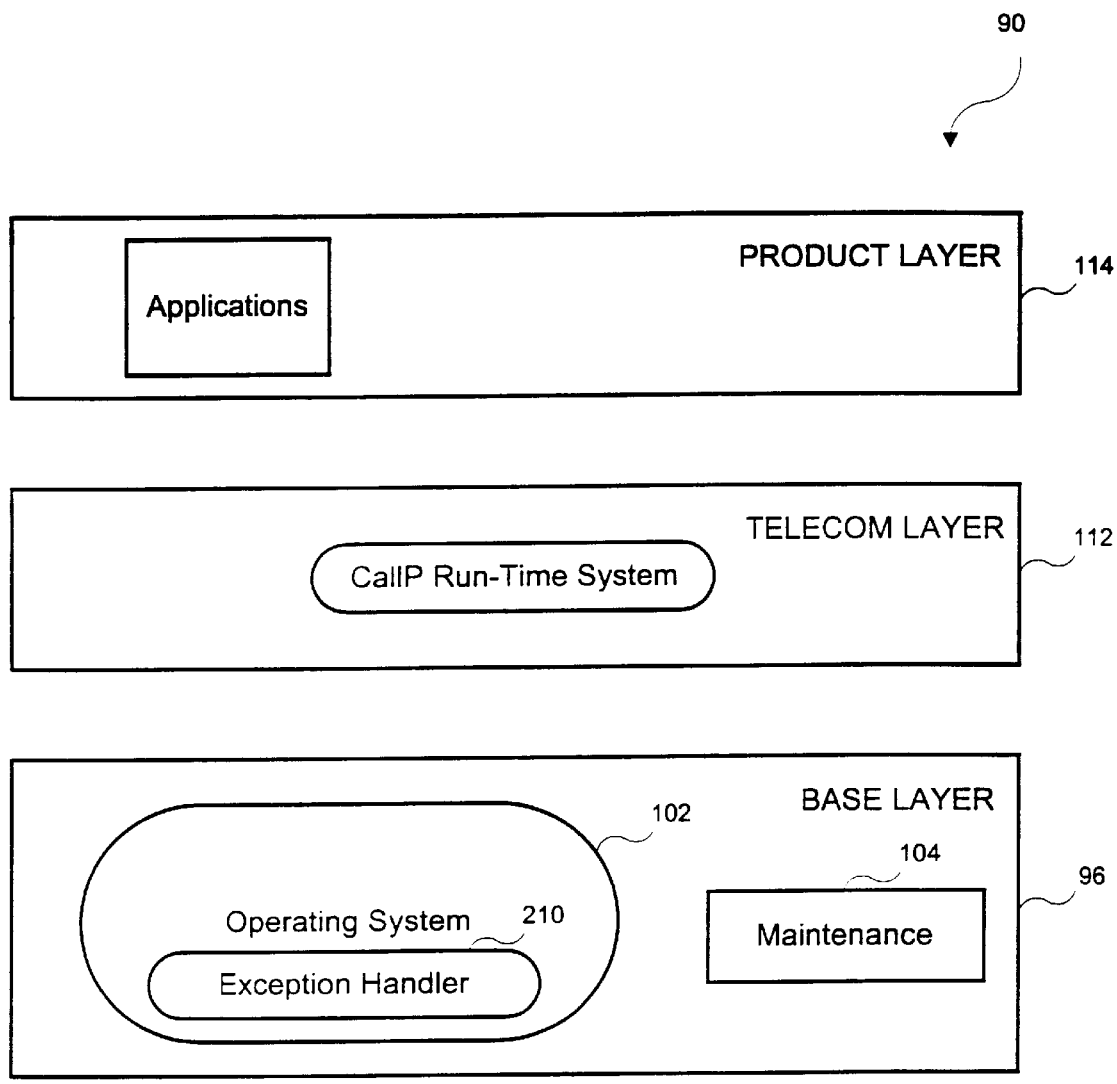
FIG. 4 is a block diagram of software forming part of the system of FIG. 1.

The architecture of the software used in system 10 is illustrated in FIG. 4 and marked generally 90. Specifically, software system 90 comprises a base layer 96 that interfaces with the hardware of system 10 and includes an operating system 102 ("OS") and maintenance software 104. Forming part of OS 102 is an exception handler 210, and a process scheduler (not illustrated). A further telecommunications layer 112 handles call processing of any calls switched by system 10. A final product layer 114, includes code written primarily for previously existing multi-tasking single processor systems such as DMS™ 100 or DMS™ 250 telecommunications switches. Software layers 96, and 112, attempt to make the software and hardware architecture of system 10 substantially transparent to software and product layer 114. These layers facilitate the transport of existing DMS™ software to newly architected system 10. The program portions of software system 90 are loaded in their entirety into RAM 54 of each and every PE 16. The data portion are stored in shared memory 12. In order to make the architecture of system 10 transparent OS 102 must take advantage of the multi-processing architecture while maintaining existing functionality and interfaces to running applications.

Existing software supports multiple processes running on a single processor applications using mutual exclusion primitives and messaging facilities to enter, process and execute in the appropriate sequence. A scheduler forming part of the OS 102 executes on each PE and effectively distributes processes to be executed across multiple PEs 16. As previously noted, the check point, roll back and memory ownership schemes in system 10, as disclosed more particularly in U.S. patent application Ser. No. 08/774,548 the multi-processor system appear to be a single processor system while making use of the full computing capacity available.

The processes are, in turn, executed on processor block 50 of a PE 16. An executing process has access to shared memory required by the process and stored on shared memory modules 14. Access to shared memory by another process executing on other PEs 16 is restricted by the referred to memory "ownership" scheme. Only when a process successfully completes are any changes to shared memory committed and the memory ownership is released. In the event that a process is not successfully completed or terminated, the modified shared memory is not committed and instead previous memory values are rolled back before ownership of the shared memory is relinquished.

When a second process attempts to access memory owned by a first process, the second process is prevented from doing so by the hardware of system 10 and is interrupted. The process scheduler of OS 102 rolls back the second process to reschedule it after the first process has completed.

As noted, identical copies of the program portion of software system 90 are stored in RAM 54 of each PE 16. Simultaneously running copies of the software system arbitrate overall system co-ordination and scheduling of processing using shared memory 14.

Access between PEs, IOPs and shared memory modules, 14, 16 and 18 respectively, is accomplished by exchanging a series of frames between modules on XAI 30. These frames are sent across one or more links 22, 24 and 28.

For example, a shared memory read is initiated by a PE 16, for example PE 16a. PIGI 60 of PE 16a generates a frame consisting of a request type address; a sequence number; and a source identifier identifying the originating PE 16a. This frame is broadcast to interconnected shared memory modules 14 on link 24a. At each of shared memory modules 14, the broadcast frame is received at a single memory module 14 connected to link 24a. The frame is "unpackaged" and SMOAC 36 of memory module 14 screens the frame and analyzes the accompanying read address. The SMOAC 36 uses the read address to determine whether or not a particular frame is destined for a particular shared memory module 14. Specifically, SMOAC 36 of all memory modules 14 receive the frame and compare the address of the transaction to addresses to which the module is programmed to respond. If a frame is not intended for a recipient module, it is simply discarded at the SMOAC 36 of the recipient module 14. Typically, two or more shared memory modules 14 operate in redundancy. As such, more than a single module will be programmed to respond to a particular a single address and therefore respond to the read request. If the memory address matches the response addresses, the SMOACs 36 of one or more appropriate memory modules 14 forms a response frame. The response frame contains the data requested, the sequence number from the request, the ID of the responding memory module, and a status indicator reflecting the status of the transmitting module 14. The response frame is passed by SMOAC 36 to the all PEs 16. Additionally, each SMOAC 36 of a responding memory module 14 buffers the response frame until an acknowledge signal is received from the processor.

All PEs 16 receive response frames from responding memory modules. IOPs similarly receive data in the frame. PIGIs of all PEs compare the port and sequence number in the response frame. The PIGI of all PEs except the PIGI of the transaction originating PE discard the received response frames. Depending how a PE 16 is operating, the PE either compares all responses for accuracy or processes the response that is first received. Ultimately, the PIGI 60 of the PE 16 that originated the request returns the data to associated on-board CPUs 52a and 52b. Once a frame is received, the PE sends an acknowledge signal back to the shared memory modules 14. When the responding shared memory module(s) 14, receive the acknowledgment frame, they discard the buffered response frame.

A memory write is similarly initiated by a PE 16. A PE 16 broadcasts a request frame containing a request type, address, sequence number and source ID identifying the PE. Again this frame is sent to all shared memory modules 14 on one of links 24. Only memory modules programmed to respond to the address specified in the request, process the request. If memory modules are working in redundancy, multiple modules will respond to the request. The responding modules write data to the specified memory addresses. Thereafter, the memory modules issues an acknowledge frame containing the sequence number of the request, and an identifier, identifying the shared memory card. Again, this acknowledge frame is broadcast to all PEs 16 on one of links 28. When the originating PE receives the acknowledge frame, it discards the write request frame.

Figure 5:
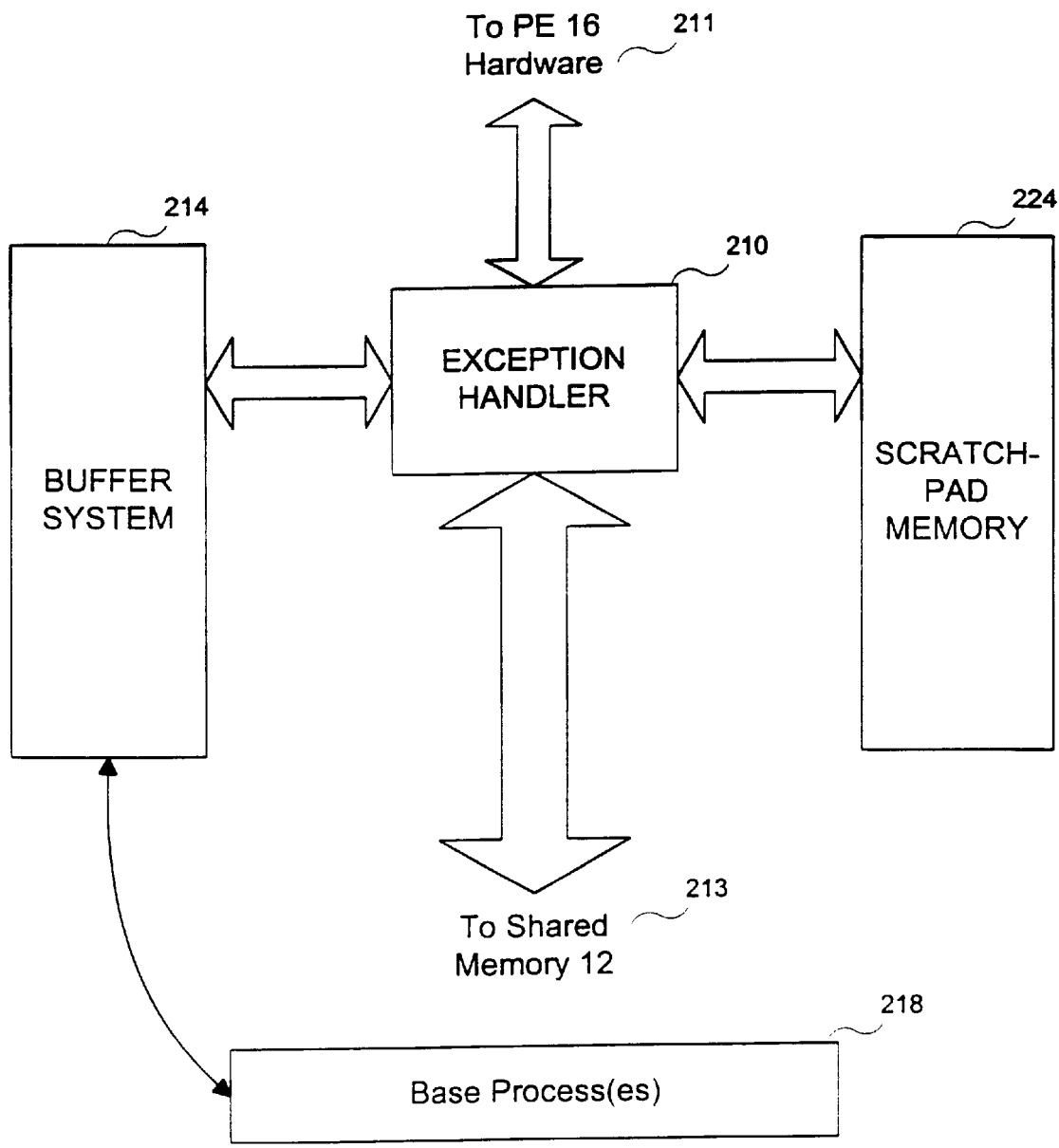
FIG. 5 is a block diagram illustrating the interaction of an exception handler with the system of FIG. 1.
Figure 6:
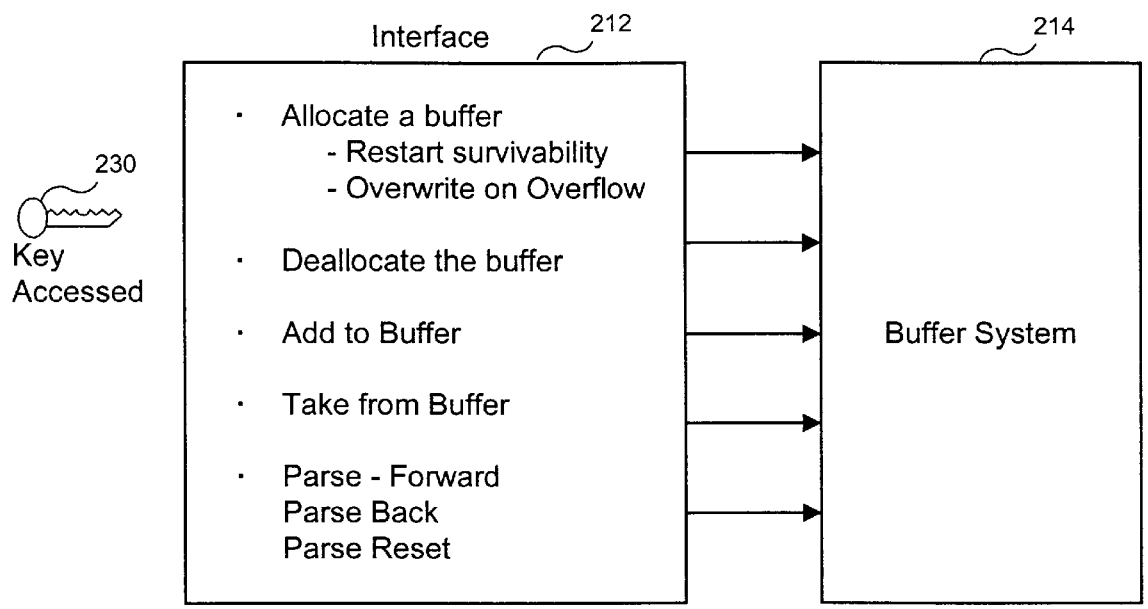
FIG. 6 is a block diagram illustrating an interface to a buffer system used by the exception handler of FIG. 5.

FIG. 5 illustrates the interaction of an exception handler generally marked 210 with the remainder of system 10. FIG. 6 illustrates the architecture of the buffer interface 212. As noted, exception handler 210 forms part of the OS 102, a copy of which is stored in RAM 54 of each PE 16. Specifically, exception handler 210 processes exceptions generated by system 10. It reads from and writes to PE hardware (generically marked 211 in FIG. 5); and it reads and writes to and from shared memory 12 (generally marked 213 in FIG. 5). As well, handler 210 reads and writes to memory buffer system 214 and scratchpad memory 224 through software interface 212 (FIG. 6). This allows for the exchange of data between exception handler 210 and non-exception base processes. Base processes 218 may access buffer system 214 through interface 212. Buffer system 214 and scratchpad memory 224 are data structures formed within the shared memory of each PE 16.

It is worth noting that the memory of buffer system 214 is transactional memory. If a memory location within buffer system 214 is accessed by a process through interface 212, and an exception occurs requiring modification of the location, the base process accessing the location is interrupted and rolled back. Of course, it might be possible to store buffer system 214 within RAM 54 of each PE 16. This, however, would require a mechanism to provide access to buffer system 214 across PEs 16.

Buffer interface 212 is a software interface that creates and provides access to buffer system 214. Interface 212 is a software interface accessible by base processes 218 and exception handler 210. The interface 212 allocates and deallocates buffers; it adds data entries to the buffer and takes the data entries from the buffer system 214. Further, it serves as the interface to parse through individual entries of buffer system 214. Typically, a buffer is allocated by an application, such as for example a debugger. The application is executed by one or more base processes, and a signal handler that is bound in with exception handler 210. Typically, the base processes will wish to obtain data from the signal handler bound in with the exception handler.

Upon creation of a buffer, a key 230 to the buffer is created; this key 230 acts as an index to the buffer, and is required for proper access to the buffer. No direct access to an allocated buffer is possible. The buffer may only be accessed through an interface 212 using key 230. Key 230 is a data construct stored in shared memory 12, and is shared between base processes and exception handler 210. More specifically, it is typically shared by the application creating the buffer and its associated signal handler. However, key 230 is only shared between applications that legitimately have access to the buffer and exception handler 210. Thus, incorrect access to a buffer by illegitimate applications is made difficult. An application (FIG. 4) may also deallocate a buffer through interface 212. This may be desirable if a buffer is corrupted.

Figure 7:
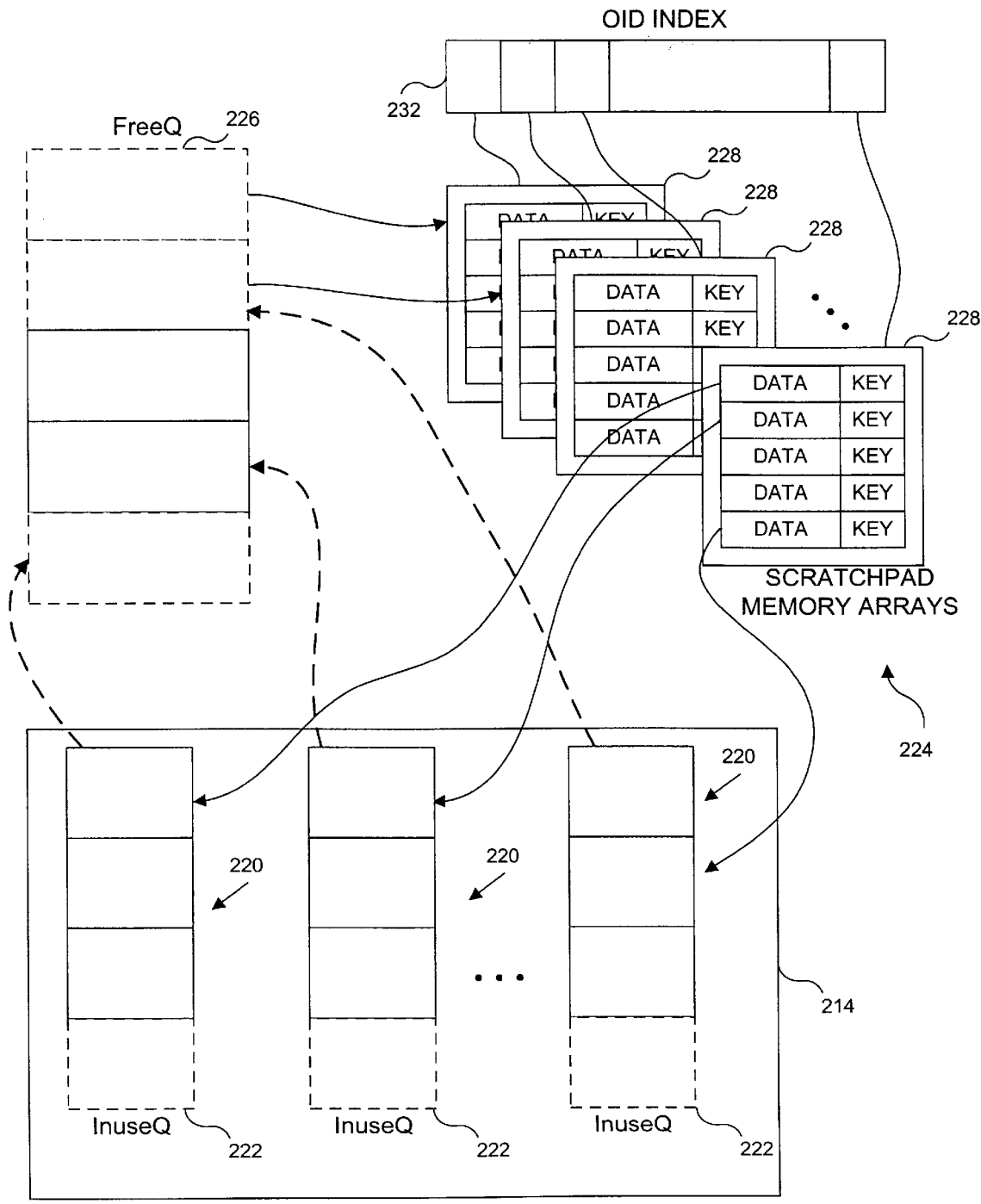
FIG. 7 is a block diagram illustrating, among other things, the buffer system of FIG. 6.

The structure of buffer system 214 may be better understood with reference to FIG. 7. Specifically, buffer system 214 comprises a plurality of individual buffers 220. Each buffer 220 comprises an InUseQ 222. Initially each InUseQ 222 is empty, and only referred to by key 230 generated by interface 212, upon the creation of an associated buffer 220. As data is added to a buffer 220 through interface 212, entries from a FreeQ 226 are allocated to the respective InUseQ 220. Conversely, as data is removed from a buffer 220, removed entries of InUseQ 220 are returned to FreeQ 226 by interface 212. As well, before data is added to InUseQ 220, it may be buffered in intermediate scratchpad memory 224, as more particularly described below. Scratchpad memory 224 is also a data structure stored within RAM 54 of PEs 16.

Scratchpad memory 224 comprises a plurality of scratchpad arrays 228 as illustrated in FIG. 7. As illustrated, each scratchpad array 228 may contain a plurality of data entries and an associated key 230 for each data entry. Each scratchpad array is created and augmented from entries of FreeQ 226. As will become apparent, all data entries of each scratchpad array 226 is associated with a single base process responsible for the creation of data entry. Moreover, each data entry is associated with a key 230 identifying a buffer for which the data is destined. As well, arrays 228 are indexed by the process identifiers 232, each identifying a base process executing on system 10.

Handler 210 (FIG. 4) is adapted to handle two distinct types of non-transactional events:

a) exceptions that generate data that is independent on the successful transaction of a base level process (referred to as process independent event handling ("PIEH"))—examples include physical card error exceptions; or timer exceptions;

b) exceptions that generate data that is dependent on the successful completion of a base level process (referred to as process dependent event handling ("PDEH"))—examples include debug tracepoint; program flow trace handling; and message trace handling.

In operation, system 10 may initially be in a fully functional state. Shared memory 12 is configured so that for each shared memory module 14, another shared memory module provides redundant storage. Scheduling software forming part of OS 102, dispatches processes of the application software to be executed by system 10 among various PEs 16. Processes are distributed to available PEs and an attempt is made to equally distribute processes across PEs 16. The PEs 16 permanently write to shared memory by completing transactions. As processes are completed changes to shared memory 12 are committed. Each base process is associated with a process identifier (referred to as an ownership identifier "OID"), also used by tag memory 40 to attribute memory "ownership" to executing processes.

During execution of base processes, one of numerous possible process independent or dependent exceptions may occur. Examples of process independent exceptions include traps, asynchronous exceptions; hardware errors; or timer exceptions. Examples of process dependent exceptions include debugger exceptions; and exceptions caused by external hardware due to process execution. Exceptions are handled by the processor block 50 of a PE 16, as a result of software exception (or interrupt) requests initiated by the processors 52a and 52b of a PE 16.

As noted, applications that wish to obtain data from exceptions through buffer system 214 may do so by creating an appropriate buffer 220 and a key index. As well, these applications may bind in appropriate signal handlers with exception handler 210. Each signal handler comprises a set of processor instructions that will be executed as a result of one or more defined exceptions.

Specifically, upon occurrence of an exception, the processor block 50 of a PE 16 passes control to exception handler 210. Handler 210 determines the origins of the exception, and whether the exception is a process dependent or process independent exception by analyzing the source and type of exception.

As exceptions are non-transactional, the reading and writing of data as a result of exceptions must be made permanent. However, at the same time, for process dependent exceptions, it should be possible to roll-back the results of any exceptions originating from bases processes that do not complete.

Figure 8:
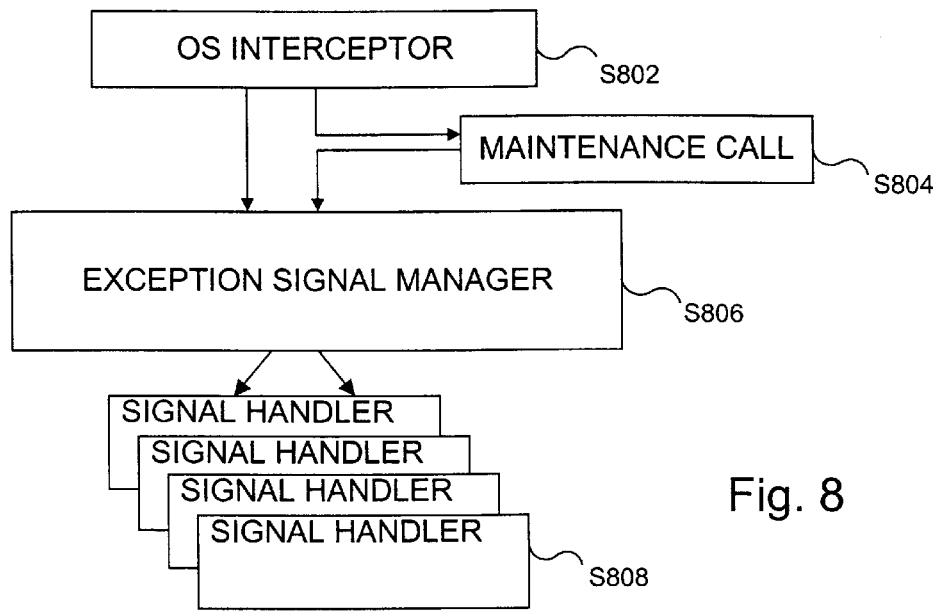
FIG. 8 is a flow chart illustrating a series of steps executed by the exception handler of FIG. 5.

Accordingly, the steps performed in reading and writing data by exception handler 210 are illustrated in FIG. 8 and marked generally as 800.

As illustrated, control to exception handler 210 is passed in step S802. If necessary, in step S804, the exception handler 210 initiates a maintenance call to maintenance software 104 (FIG. 4) to determine which process, if any, initiated the exception. If the exception is the result of a particular process, it is said to be dependent on that process. In step S806, an Exception Signal Manager queues exception signals so that the associated exception are processed by the exception handler in order of priority, as determined by handler 210. Eventually, in step S808 one of numerous signal handlers processes the exception. Which signal handler processes an exception, and the precise steps taken by each handler will vary from exception to exception. As noted, a signal handler may be bound in with exception handler 210 by an application. Alternatively, a signal handler may form a permanent part of exception handler 210. The described signal handlers and Exception Signal Manager are all software routines forming part of exception handler 210 and stored within local PE memory 54 to adapt an associated processor block to properly process exceptions.

Figure 9:
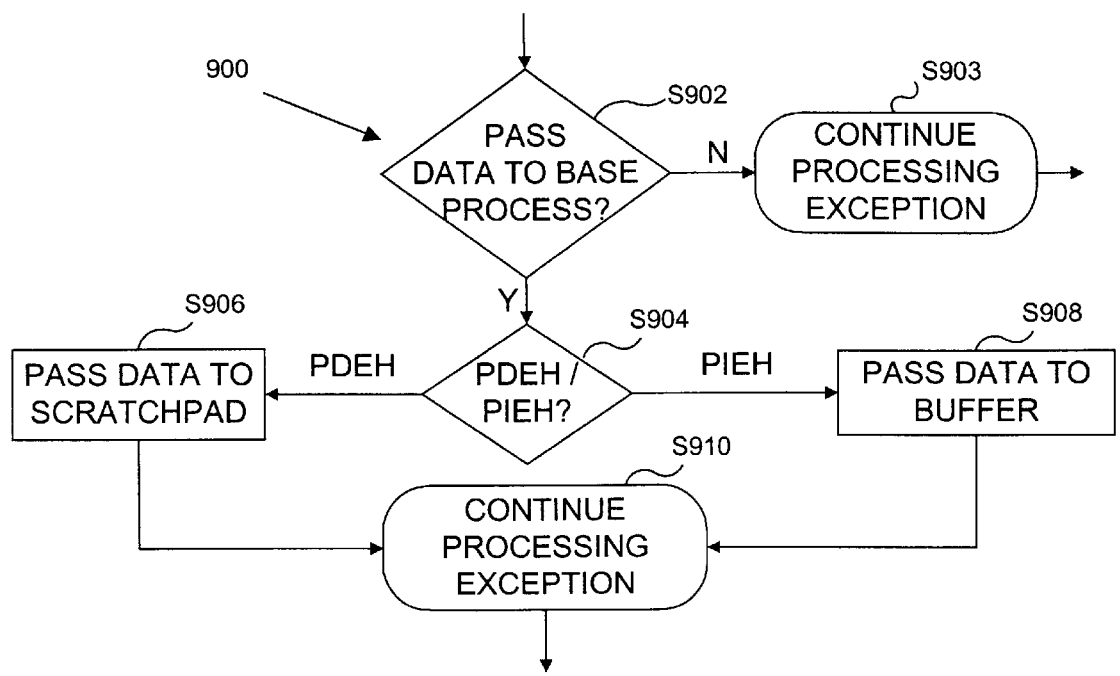
FIG. 9 is a further flow chart illustrating a series of steps executed by the exception handler of FIG. 5.

Each signal handler, may need to communicate with a base process. Thus, numerous signal handlers executed in step S808 may incorporate a software subroutine as illustrated in FIG. 9, and marked generally 900. Specifically, a signal handler of exception handler 210 determines whether the signal handler of exception handler 210 needs to pass data to a base process. If not, exception handler 210 merely continues processing exceptions as illustrated in step S903.

As noted, in order to share data with executing processes, exception handler 210 uses buffer system 214, as illustrated in FIG. 7. Specifically, if the exception is process independent, any data to be transferred to a base process is transferred directly to one InuseQ 222, using a key 230 shared between an associated signal handler and the base process and an "add_to_buffer" instruction provided by interface 212 in step S904. This causes interface 212 to obtain an entry from FreeQ 226, fill it with data and place it on the appropriate InuseQ 222, associated with the key 230. After data is passed to buffer system 214 in step S906, handler 210 continues processing exceptions. Eventually control of the PE processor block 50 is returned to the base executing process interrupted by handler 210.

If, on the other hand, the exception is process dependent, free memory is dequeued from FreeQ 226 and enqueued onto scratchpad memory 224 in step S906, as best illustrated in FIG. 7. The pertinent data is buffered by exception handler 210 into a scratchpad array 228 of scratchpad memory 224. This scratchpad memory array is based on the identifier of a base process obtained in step S804 (FIG. 4). All entries of a single scratchpad memory array result from a single base process. Moreover, all scratchpad memory arrays 228 are indexed using base process identifiers 232. Scratch pad memory 224 is preferably allocated within shared memory 12, but could be allocated within RAM 54 of PEs 16.

After handler 210 buffers the exception data to scratchpad memory 224, it continues processing exceptions, and eventually returns control to the exception initiating base executing process.

The validity of data buffered in scratchpad memory 224 is dependent on the successful completion of the base process on which the exception depends. Therefore, upon successful completion of a process data in a scratchpad memory array 228 associated with that process is transferred from scratchpad memory 224 onto InuseQs 220. Each data entry within an array is passed to one of buffers 220, based on the key identifier associated with and stored within the scratchpad memory array 228. This is done by the process scheduler (not shown) forming part of OS 102.

In the event that the base process fails and is rolled back, the contents of the scratchpad memory 224 associated with that base process are discarded, and the scratchpad memory is returned to FreeQ 226.

Any executing process may access buffer 214, and thereby access entries of buffer 220 through interface 212, if the process has the key identifying and indexing the appropriate buffer 220. Specifically, the base process associated with the application that created a buffer 220 already has access to an associated key 230. Another base process may, for example, obtain this key from the base process associated with the signal handler through conventional interprocess communication. In any event, any process that has access to a particular key 230 may then use this key as an index to buffer system 214, and may parse through an associated buffer 220 using "parse_forward" and "parse_backward" function calls through interface 212. As the process parses through entries buffer system 214 it may identify data identified required by the base process. Using a "take_from_buffer" instruction provided by interface 212, the process is able to dequeue an entry from InUseQ 220. The memory location used by the entry is returned to FreeQ 226.

As an example, a debugger application may create a buffer and integrate an appropriate signal handler with exception handler 210. An associated key 230 would also be created and shared between the signal handler and debugger. A program stored within RAM 54, and executing on any one of PEs 16 may include trace points used by the debugger. The program would be modified to include instructions to invoke the debugger at preset tracepoints. Upon execution of the modified program, a process associated with the program would initiate an exception which invokes the exception handler 210. In response the integrated signal handler would capture certain processor information to be used by the debugger. Such processor information may include the value of registers, pointers or memory. Handler 210 would then pass the values desired by the debugger application to scratchpad memory 224. Once the base process associated with the program completes, data in scratchpad memory 224 would be passed to buffer 220.

If, however, the base process associated with the program did not successfully complete, data would not be transferred to buffer 220. The base process would be rescheduled and re-executed at a later time until it is successfully completed.

A base level debugger process could, at a later time, retrieve values from the buffer system 214 of the debugged process using the created key.

It will be appreciated that while the above described embodiments have been described as requiring the relocation and movement of data from and to FreeQ 226; scratchpad arrays 224; and buffer system 214, such movement is preferably accomplished by transferring and altering data pointers to the appropriate memory constructs.

As well, it will be understood that the illustrated exception handler, and particularly steps 800 and 900 have been simplified for illustration purposes. Exception handler 210 may serve numerous functions and execute numerous steps not illustrated. Moreover, the illustrated steps may be re-ordered or be executed in between numerous steps that have not been illustrated. It will be further be appreciated that the above described steps are susceptible to numerous modifications. For example, writes by exception handler to shared memory 12 could be queued. The transactional system need not use the disclosed hardware shared memory system. Instead exception handler 210 could form part of a transactional system formed entirely in software. Similarly the structure of key 230 could be replaced with any appropriate reference structure to buffer system 214.

Indeed, while the preferred embodiment is specific to a multi-processor shared memory system, the present invention could easily be extended to other computing system having transactional subsystems. For example, the above described exception handler could form part of a computing system used to process reversible financial transactions; a data base system or the like.

It will be further understood that the invention is not limited to the embodiments described herein which are merely illustrative of a preferred embodiment of carrying out the invention, and which are susceptible to modifications of form, arrangement of parts, steps, details and order of operation. The invention, rather, is intended to encompass all such modification within its spirit and scope, as defined by the claims.

We claim:

1. In a computer system comprising at least one processor for executing a plurality of software processes and one memory module comprising shared memory accessible by said processor, wherein altering said shared memory is reversible until an executing process has successfully completed, a method of handling an exception dependent on an executing process comprising the steps of:
   a. buffering data resulting from said exception in a scratchpad memory;
   b. upon successful completion of said process, moving said data buffered in step a. to a buffer system accessible by other software processes executing on said system; and
   c. upon unsuccessful completion of said process, discarding said data buffered in step a.

2. The method of claim 1, wherein said buffer system comprises at least one exception buffer comprising a queue.

3. The method of claim 2, wherein each of said exception buffers is an associated reference identifier.

4. The method of claim 3, wherein each reference identifier uniquely identifies one of said exception buffers.

5. The method of claim 4, wherein said buffer system is accessible through an interface.

6. The method of claim 5, wherein a non-exception process may access a buffer through said interface by identifying an exception buffer by an associated reference identifier.

7. The method of claim 6, wherein said reference identifier comprises an index key.

8. A computing system comprising
   a processor for executing at least one process;
   scratchpad memory;
   a transactional subsystem interconnected with said processor and having a plurality of states wherein state changes to said transactional subsystem are made irreversible only upon successful completion of a transaction;
   program memory interconnected with said processor and containing an exception handler for handling an exception dependent on a transaction, said handler adapting said processor to,
      a. buffer data resulting from said exception in said scratchpad memory;
      b. upon successful completion of said transaction, transfer data buffered in step a. to an exception buffer accessible by software processes executing on said processor; and
      c. upon unsuccessful completion of said transaction, discard said data buffered in step a.

9. The computing system of claim 8, wherein said transactional subsystem comprises a memory system, comprising computer memory and wherein said states comprise possible states of said computer memory.

10. The computing system of claim 8, wherein said program memory further contains a program, that when executed by said processor forms a process adapted to read data from said exception buffer.

11. The computing system of claim 10, wherein said program memory further contains a buffer interface program used by said process to access said exception buffer.

12. The computing system of claim 10, wherein said buffer interface program adapts said processor to access said exception buffer using a key.

13. In a computing system comprising a processor and a transactional subsystem wherein state changes to said subsystem are effected by transactions and are reversible until a transaction has successfully completed,
   a method of handling exceptions resulting from a transaction, comprising the steps of:
      a. buffering data resulting from said transaction in a scratchpad memory;
      b. upon successful completion of said transaction, moving said data buffered in step a. to a buffer system accessible by software processes executing on said system; and
      c. upon unsuccessful completion of said transaction, discarding said data buffered in step a.

* * * * *